(12) United States Patent
Mahoney et al.

(10) Patent No.: US 7,297,180 B2
(45) Date of Patent: Nov. 20, 2007

(54) METHOD FOR OPERATING A VACUUM VESSEL WITH A COHERENT JET

(75) Inventors: William J. Mahoney, East Aurora, NY (US); Gary T. Vardian, Grand Island, NY (US); Adrian C. Deneys, Bedminster, NJ (US); Michael F. Riley, Greenwood, IN (US); Ronald Holmes, Aliquippa, PA (US); Al Zoladz, North Tonawanda, NY (US); Larry E. Cates, Brownsburg, IN (US)

(73) Assignee: Praxair Technology, Inc., Danbury, CT (US)

( * ) Notice: Subject to any disclaimer, the term of this patent is extended or adjusted under 35 U.S.C. 154(b) by 10 days.

(21) Appl. No.: 11/179,616

(22) Filed: Jul. 13, 2005

(65) Prior Publication Data

US 2007/0012139 A1    Jan. 18, 2007

(51) Int. Cl.
*C22B 5/20* (2006.01)
*C21B 7/16* (2006.01)
(52) U.S. Cl. .......................... 75/530; 75/414; 266/268
(58) Field of Classification Search ................ 75/414, 75/530; 266/225, 268
See application file for complete search history.

(56) References Cited

U.S. PATENT DOCUMENTS

| | | | |
|---|---|---|---|
| 3,427,151 A | 2/1969 | Koudelka et al. ........... 75/59 |
| 5,266,024 A | 11/1993 | Anderson ...................... 431/11 |
| 5,700,421 A | 12/1997 | Bissonnette .................. 266/48 |
| 5,814,125 A | 9/1998 | Anderson et al. ............. 75/414 |
| 5,931,985 A | 8/1999 | Schoeler et al. .............. 75/414 |
| 6,125,133 A | 9/2000 | Mathur et al. ................. 373/8 |
| 6,171,544 B1 | 1/2001 | Anderson et al. ............ 266/47 |
| 6,355,205 B1 | 3/2002 | Orito et al. ................... 266/99 |
| 6,432,165 B1 | 8/2002 | Dittrich et al. ............... 75/529 |
| 6,450,799 B1 * | 9/2002 | Mahoney et al. ........... 266/225 |
| 6,604,937 B1 | 8/2003 | Mahoney ....................... 431/8 |
| 6,773,484 B2 * | 8/2004 | Mahoney et al. ........... 266/225 |
| 6,875,398 B2 * | 4/2005 | Mahoney .................... 266/268 |

OTHER PUBLICATIONS

R.M. Fristrom et al., "Methane-oxygen Flame Structure. I. Characteristic Profiles in a Low-pressure, Laminar, Lean, Premixed Methane-oxygen Flame", J. Phys. Chem. 64, 1386-92 (1960).

* cited by examiner

*Primary Examiner*—Scott Kastler
(74) *Attorney, Agent, or Firm*—Flora W. Feng

(57) ABSTRACT

A method for operating a vacuum vessel with a coherent jet wherein vacuum conditions are established within the vessel and an anchored or attached flame envelope resulting from subsonic velocity fuel and oxidant is provided around at least one supersonic gas stream.

10 Claims, 3 Drawing Sheets

METHOD FOR OPERATING A VACUUM VESSEL WITH A COHERENT JET

TECHNICAL FIELD

This invention relates generally to supersonic or coherent jet technology.

BACKGROUND ART

A recent significant advancement in the field of gas lancing is the development of the coherent jet technology disclosed, for example, in U.S. Pat. No. 5,814,125—Anderson et al. and in U.S. Pat. No. 6,171,544—Anderson et al. In the practice of this technology one or more high velocity gas jets ejected from one or more nozzles on a lance are maintained coherent over a relatively long distance by the use of a flame envelope around and along the high velocity gas jet(s). The flame envelope is formed by combusting fuel and oxidant ejected from the lance from one or more rings of ports around the nozzle(s). The fuel and oxidant combust under atmospheric pressure conditions to form the flame envelope. Operation of this technology under subatmospheric pressure conditions would be desirable. However, it is problematic because of the negative effects of flame lift-off and blowout experienced under such conditions.

SUMMARY OF THE INVENTION

One aspect of the present invention is:

A method for forming and maintaining a coherent gas jet within a vessel comprising injecting gas in a gas stream at a supersonic velocity from an injection device into the vessel wherein vacuum conditions are established, providing fuel and oxidant at a subsonic velocity into the vessel around said gas stream, and combusting said fuel and oxidant to form a flame envelope around said gas stream to form and maintain said gas stream as a coherent gas jet.

Another aspect of the invention is:

A method for operating a metallurgical vessel containing molten metal and having a headspace above the molten metal, said method comprising injecting gas in a gas stream at a supersonic velocity from an injection device into the headspace wherein vacuum conditions are established, providing fuel and oxidant at a subsonic velocity into the headspace around said gas stream, combusting said fuel and oxidant to form a flame envelope around said gas stream, and passing gas from said gas stream to said molten metal.

As used herein the term "vacuum conditions" means a pressure less than ambient atmospheric pressure, and, for a metallurgical vessel, preferably within the range of from 10 to 300 Torr, most preferably within the range of from 35 to 150 Torr.

DETAILED DESCRIPTION

Figure 1:
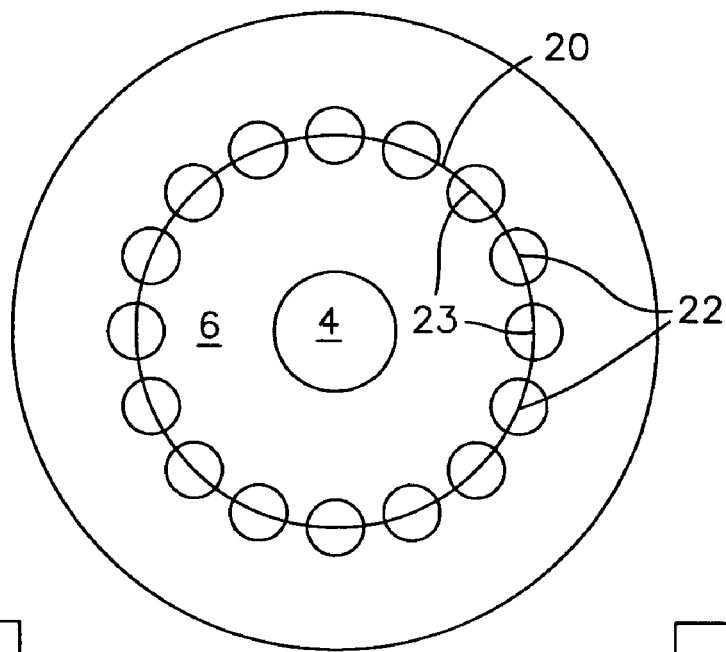
FIG. 1 is a head on view of one preferred embodiment of the face of an injection device and FIG. 2 is a cross sectional view of one preferred embodiment of an injection device having such face which may be used in the practice of this invention.
Figure 2:
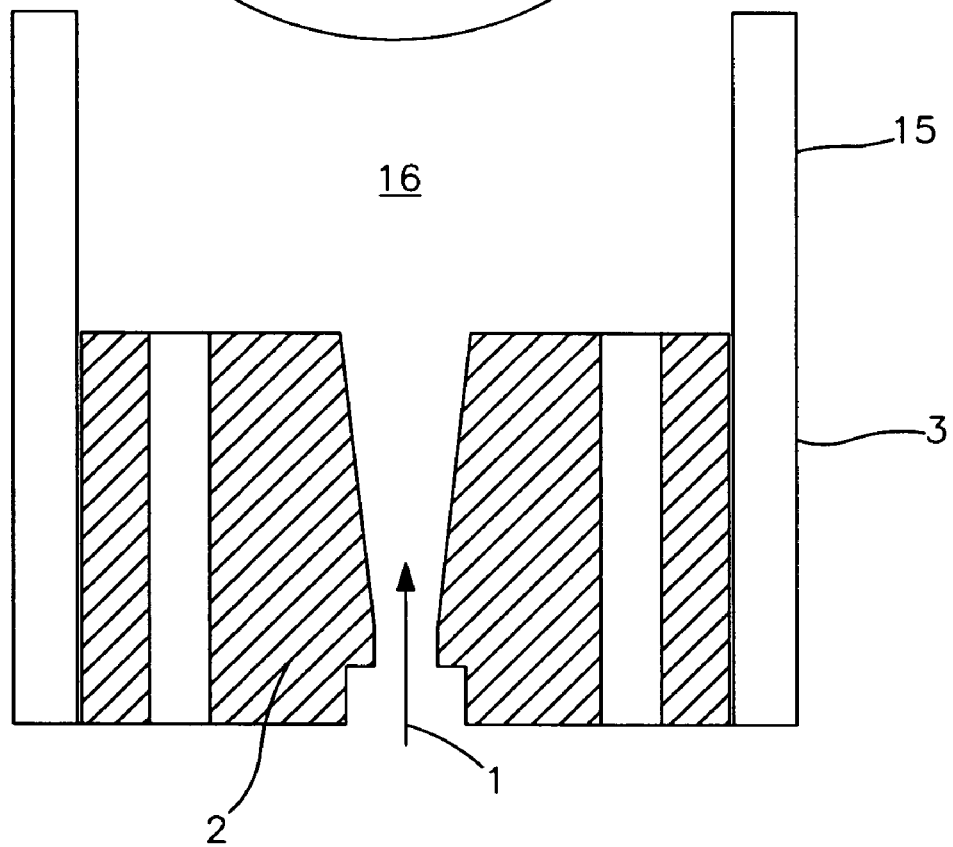

The invention will be described in detail with reference to the Drawings.

Referring now to the Figures, gas as shown by flow arrow 1, is passed through at least one nozzle 2, preferably a converging/diverging nozzle, and then out from injection device 3 through nozzle opening 4 on face 6 to form a coherent gas jet stream 5 having a supersonic velocity within the range of from greater than Mach 1 to about Mach 6, preferably within the range of from Mach 3 to Mach 4.5 and may have a flowrate of up to about 100,000 scfh or more. The number of gas jets ejected through respective nozzles in the practice of this invention may be within the range of from 1 to 6. The injection volume into which the coherent gas jets are injected may be a metal treatment station such as a vacuum treatment station. When a plurality of nozzles is employed, each nozzle may be angled away from each other and from the center axis of the lance.

Any effective gas may be used as the gas for forming the coherent jet or jets in the practice of this invention. Among such gases one can name oxygen, nitrogen, argon, carbon dioxide, hydrogen, helium, steam and hydrocarbon gases. Preferably the gas is commercially pure oxygen. Also mixtures comprising two or more gases, e.g. air, may be used as such gas in the practice of this invention.

A ring 20 of ports is located on face 6 around the nozzle opening or openings 4. Ring 20 is preferably a circle having a diameter within the range of from 0.75 to 20 inches. Generally ring 20 will comprise from 6 to 48 ports. Each port exit is preferably a circle having a diameter within the range of from 0.125 to 3 inches. However, the ports may have a non-circular shape such as a rectangular shape or an elliptical shape. The ring of ports may be in a recession or groove on lance face 6 to help support flame stabilization. Typically such a recession has a depth within the range of from 0.125 inch to 24 inches and a width within the range of from 0.125 to 3 inches. The parameters for any particular injection device design will be dependent on the flowrate of the supersonic gas jet(s).

A flame envelope is formed around and along the supersonic gas stream(s) by combusting fuel and oxidant provided from the ports. The fuel and oxidant may be provided from the ports as a mixture, i.e. in a premixed arrangement, or may be provided separately and mixed after injection into the injection volume from the injection device. The latter method is preferred and is described more fully below.

Fuel is provided to a first set of ports 22 on ring 20 and oxidant is provided to a second set of ports 23 on ring 20. Preferably, as illustrated in FIG. 1, the first set of ports 22 alternates with the second set of ports 23 on ring 20 so that each fuel port 22 has two oxidant ports 23 adjacent on either side of that fuel port, and each oxidant port 23 has two fuel ports 22 adjacent on either side of that oxidant port. The fuel and oxidant are ejected from injection device 3 from their respective ports into the injection volume. The velocity of the fuel and oxidant ejected from the ring of ports has a subsonic velocity, preferably within the range of from 200 to 1000 feet per second.

The fuel ejected from ports 22 is preferably gaseous and is a hydrogen-containing fuel. Among such fuels one can name hydrogen, methane, natural gas, coke oven gas, synthesis gas, petroleum gas, propane, butane, and gasified or vaporized fuel oils. The oxidant ejected from ports 23 may be air, oxygen-enriched air having an oxygen concentration exceeding that of air, or commercial oxygen having an oxygen concentration of at least 90 mole percent. Preferably the oxidant is a fluid having an oxygen concentration of at least 25 mole percent.

The fuel and oxidant passed out from the injection device form a gas envelope around gas jet 5 which combusts to form a flame envelope or flame shroud around the gas jet(s) within the injection volume. The flame envelope 24 around the gas stream serves to keep ambient gas from being drawn into the gas stream or streams, thereby keeping the velocity of the gas stream or streams from significantly decreasing and keeping the diameter of the gas stream or streams from significantly increasing thus serving to establish and maintain gas stream 5 as a coherent jet.

Alternatively, the fuel and oxidant may be provided respectively from two rings of ports on the face, an inner ring of ports around and closest to the central nozzle(s) 4, and an outer ring of ports radially spaced from and around the inner ring of ports. Preferably the fuel is provided from the inner ring of ports and the oxidant is provided from the outer ring of ports. The ports on the outer ring of ports may be aligned with or offset from the ports on the inner ring of ports.

The flame shroud fuel and oxidant can be expressed as a stoichiometric ratio. The stoichiometric ratio definition is the operating fuel and oxygen ratio (F/O) divided by the F/O required for complete combustion. For example, where the fuel is methane and the operating F/O is 1.25, since stoichiometric for complete combustion of methane and oxygen is 0.5, the stoichiometric ratio in this example is 1.25/0.5 or 2.5. Preferably in the practice of this invention, the stoichiometric ratio of the flame shroud fuel and oxygen is greater than 2.

Extension 15 extends from the face to form a recirculation zone 16 into which the gas stream and the flame envelope gases are initially injected. Typically the extension will be cylindrical in shape, although other shapes are possible, and will have a length within the range of from 0.5 to 24 inches and a diameter within the range of from 1.0 to 24 inches. The recirculation zone 16 formed by extension 15 serves to assist the initial formation of the flame envelope around the gas stream and to anchor the flame envelope to the face of the injection device under the vacuum conditions of the vessel. The particular parameters of the extension will depend of the main gas flowrate. The invention may be practiced with the extension and/or the flame envelope port grooves discussed above to help support flame stabilization. The extension may be part of the injection device itself or may be formed separately.

The subsonic velocity of fuel and oxidant and the flame envelope around the gas stream(s) resulting from the combustion of the fuel and oxidant coupled with the recirculation of gas adjacent the face serves to maintain the flame envelope attached or anchored to the face under vacuum conditions, thus avoiding flame lift-off and blowout. The resulting integrity of the flame envelope serves to maintain the gas stream or jet coherent. This enables the gas stream to travel a longer distance than would otherwise be the case while maintaining a supersonic velocity. This is particularly advantageous in a metallurgical application because the coherent jet device does not have to protrude into the treatment chamber as compared to conventional lance devices that must significantly protrude into the chamber during treatment. As a result in the conventional case special sliding seals and hoisting equipment must be mounted on top of the vessel to retract the conventional lance from the vessel when the treatment has ended. Also the coherent jet device will not suffer the damage that occurs to a conventional lance and sliding seals.

Figure 3:
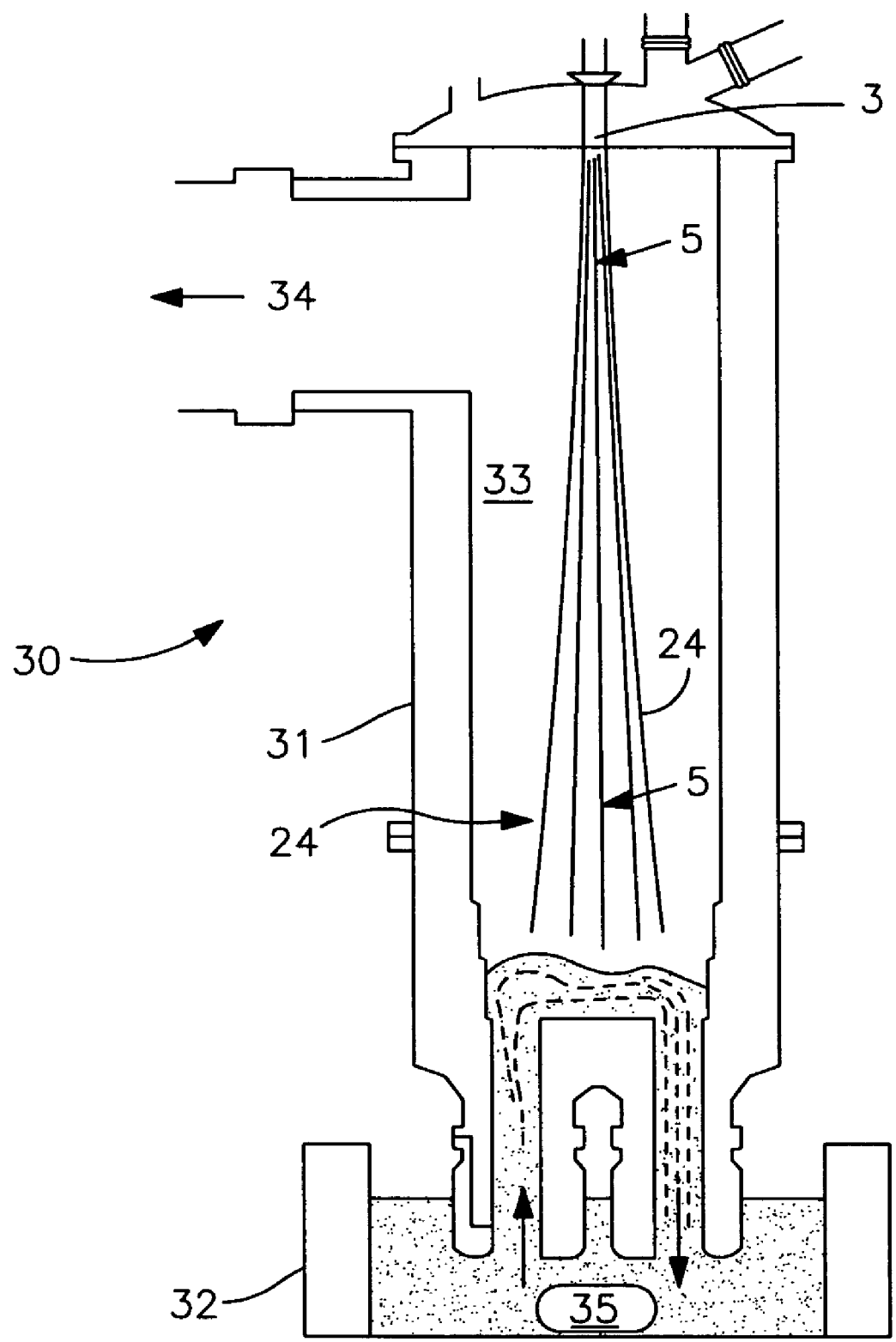
FIG. 3 illustrates one embodiment of the invention in operation in a metallurgical vessel. The numerals in the Drawings are the same for the common elements.

One important application for the practice of this invention is in a metallurgical vessel operating at subambient pressure, such as the vacuum refining process illustrated in FIG. 3. In this particular practice, metallurgical vessel 30 comprises a chamber 31 and a ladle 32 which contains molten metal 35. Vacuum conditions are established within the headspace 33 of vessel 30 such as by evacuation of the headspace atmosphere by means of a vacuum pump out through channel 34. Gas in gas stream 5 is then provided into headspace 33 from injection device 3 and flame envelope 24 is formed around gas stream 5 as was previously described. Preferably injection device 3 will be flush with the refractory face of the vessel or extend for only a short distance into the vessel. The injector in the practice of this invention may be a fixed position injector or may be a variable position injector that can be inserted into the vessel and moveable to various positions. The gas in gas stream 5, e.g. oxygen, is passed from injection device 3 and contacts the molten metal, e.g. steel, which, due to the vacuum refining process conditions, is induced to flow in the path shown in FIG. 3. The gas may be employed to decarburize the molten metal and/or for other purposes such as heating the molten metal by oxidizing added high energy fuels such as aluminum, silicon and the like.

With the use of this invention, the coherent jet injection device or injector face may be positioned substantially above where the face of a conventional lance would be positioned, including being positioned flush with the refractory face inside the vessel top. Preferably such distance would be about 25 feet or in the range of from 15 to 40 feet in the case of most vessels built in recent years. In the case of older shorter vessels the distance may be less but the coherent jet device or injector face would still be flush with the inside top refractory surface. There could conceivably be cases where the coherent jet injector face might have to extend from 2 to 5 feet inside the vessel to position it at the requisite distance above the molten metal surface. Nevertheless even with such a high position above the molten metal surface, the invention is able to provide gas such as oxygen into the molten metal with better efficiency than can be achieved with conventional practice.

Figure 4:
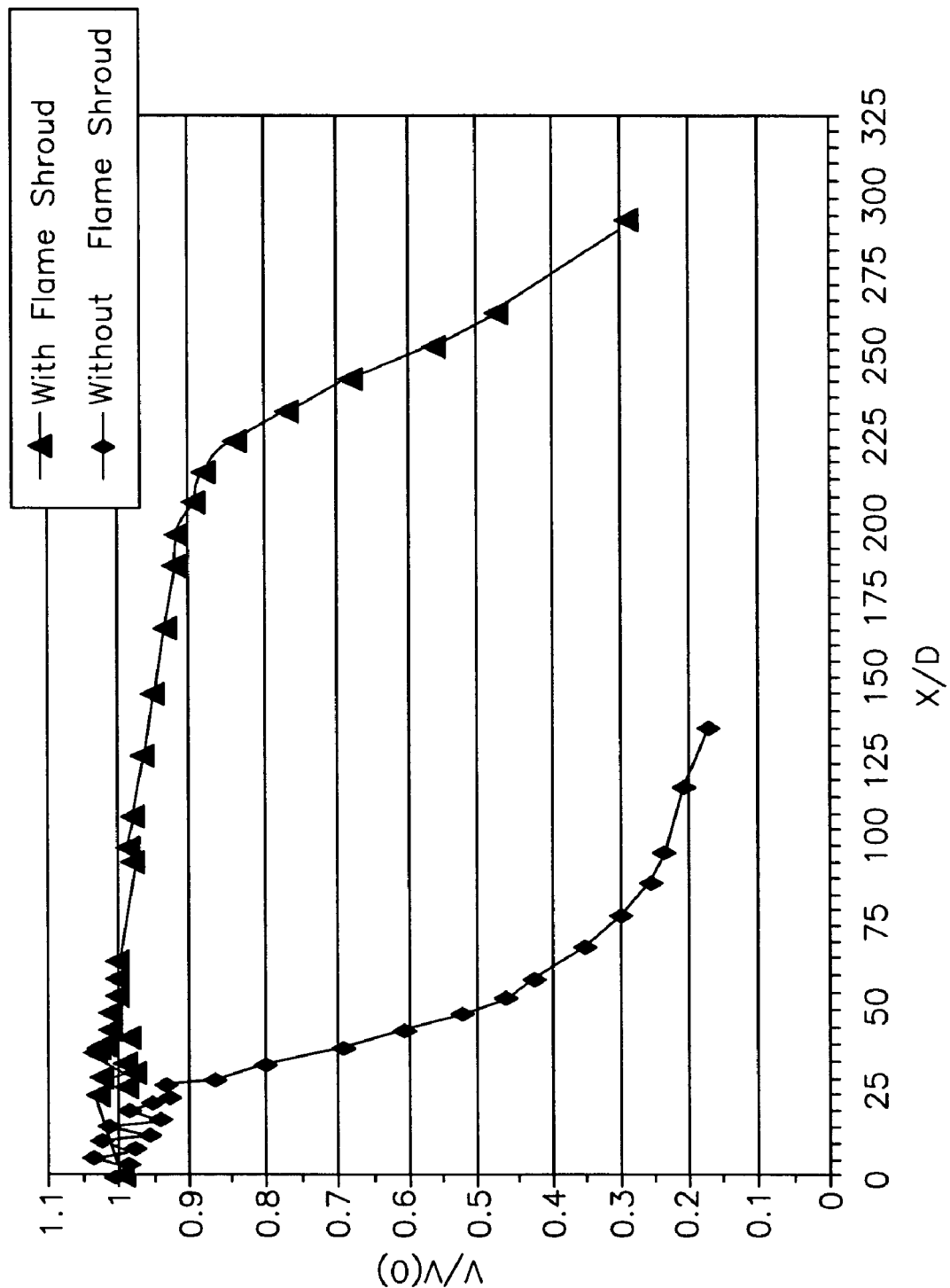
FIG. 4 is a graphical representation of results obtained with the practice of the invention compared with results without the practice of the invention.

For illustrative and comparative purposes tests were carried out with the practice of the invention and without the practice of the invention, and the results are presented in FIG. 4. The tests are presented for illustrative and comparative purposes and are not intended to be limiting.

Experiments were conducted to illustrate the effect of the flame shroud on the jet preservation characteristics by exhausting jets into an experimental vacuum chamber. Experiments were conducted at 50 Torr chamber pressure and are presented as an example. A conical converging-diverging nozzle was designed to admit 500 standard cubic feet per hour (scfh) oxygen when supplied with 150 pounds per square inch gauge (psig) upstream of the nozzle entrance and exhausting into a 50 Torr absolute (−13.73 psig) chamber pressure downstream of the nozzle exit. The nozzle throat diameter was 0.0605-in. and the exit diameter was 0.2061-in. The throat length was equal to the throat diameter and the nozzle divergence half-angle was 5 degrees. Under the flow conditions, the fully expanded oxygen jet exited the nozzle with a Mach number of 4.08 (2110 feet per second).

The flame shroud was formed by surrounding the converging-diverging nozzle with a single-ring of equally spaced and alternating fuel and secondary oxygen ports. Eight natural gas and eight secondary oxygen ports were positioned on a 1-in. diameter circle. All shroud ports were straight-walled drillings each with a diameter of 0.125-in. The natural gas flow rate was admitted at a total of 100 scfh (20 percent of the main oxygen flow) and the secondary oxygen flow was total 80 scfh. A recirculation extension located at the nozzle exit was employed to stabilize the combustion to ensure the flame was anchored to the nozzle exit. This extension had a length of 0.625-in. and a diameter of 1.25-in.

Pitot tube measurements taken from the jet at the axial centerline were recorded as a function of the distance from the nozzle exit. Measurements were recorded without the flame shroud and with the flame shroud. The results are shown in FIG. 4 which shows the calculated jet centerline velocity (normalized by the nozzle exit velocity) versus the axial distance (normalized by the nozzle exit diameter). Without the flame shroud, the distance to where the velocity had decayed to half the initial velocity (V/V(0)=0.5) was 50 nozzle diameters (X/D=50). With the flame shroud, the distance to where the velocity had decayed to half the initial velocity (V/V/(0)=0.5) was found to be 260 nozzle diameters (X/D=260). This represents an increase in jet length by a factor of 5.2 (520 percent).

Although the invention has been described in detail with reference to certain preferred embodiments, those skilled in the art will recognize that there are other embodiments of the invention within the spirit and the scope of the claims. For example the recirculation extension can be designed into the lance or injection device itself, or be formed as part of a separate assembly, e.g. insertion of the lance into a recess formed by the vessel refractory wall or a separately designed panel which houses the lance. Preferably the invention is practiced with fully expanded supersonic jets with properly designed converging/diverging nozzles. However, the invention will have some degree of effectiveness if an underexpanded jet is employed from a sonic converging nozzle or a converging/diverging nozzle.

The invention claimed is:

1. A method for forming and maintaining a coherent gas jet within a vessel comprising injecting gas in a gas stream at a supersonic velocity from an injection device into the vessel wherein vacuum conditions are established, providing fuel and oxidant at a subsonic velocity into the vessel around said gas stream, and combusting said fuel and oxidant to form a flame envelope around said gas stream to form and maintain said gas stream as a coherent gas jet.

2. The method of claim 1 wherein the stoichiometric ratio of the fuel and oxidant is greater than 2.

3. The method of claim 1 wherein the gas comprises oxygen.

4. The method of claim 1 wherein the fuel and oxidant are provided into the vessel from a single ring of ports on the injection device.

5. The method of claim 1 wherein the gas, fuel and oxidant are initially passed into a recirculation volume formed by an extension on the injection device and thereafter passed into the vessel.

6. A method for operating a metallurgical vessel containing molten metal and having a headspace above the molten metal, said method comprising injecting gas in a gas stream at a supersonic velocity from an injection device into the headspace wherein vacuum conditions are established, providing fuel and oxidant at a subsonic velocity into the headspace around said gas stream, combusting said fuel and oxidant to form a flame envelope around said gas stream, and passing gas from said gas stream to said molten metal.

7. The method of claim 6 wherein the stoichiometric ratio of the fuel and oxidant is greater than 2.

8. The method of claim 6 wherein the gas comprises oxygen.

9. The method of claim 6 wherein the fuel and oxidant are provided into the vessel from a single ring of ports on the injection device.

10. The method of claim 6 wherein the gas, fuel and oxidant are initially passed into a recirculation volume formed by an extension on the injection device and thereafter passed into the headspace.

* * * * *